(12) United States Patent
Tingley et al.

(10) Patent No.: US 11,939,872 B2
(45) Date of Patent: Mar. 26, 2024

(54) MINIATURIZED TURBOGENERATOR FOR THE DIRECT ELECTRICAL PROPULSION OF AUTOMOTIVE, URBAN AIR MOBILITY, AND SMALL MARINE VEHICLES

(71) Applicant: Triple Tango Power & Propulsion, LLC, Grand Rapids, MI (US)

(72) Inventors: William Q. Tingley, Grand Rapids, MI (US); William Q. Tingley, III, Grand Rapids, MI (US); Daniel R. Bradley, Grand Rapids, MI (US)

(73) Assignee: Tennine Corp., Grand Rapids, MI (US)

( * ) Notice: Subject to any disclaimer, the term of this patent is extended or adjusted under 35 U.S.C. 154(b) by 0 days.

(21) Appl. No.: 17/688,021

(22) Filed: Mar. 7, 2022

(65) Prior Publication Data

US 2022/0186629 A1 Jun. 16, 2022

Related U.S. Application Data

(63) Continuation-in-part of application No. 17/119,087, filed on Dec. 11, 2020, now abandoned, which is a
(Continued)

(51) Int. Cl.
*F01D 15/08* (2006.01)
*B23B 3/24* (2006.01)
(Continued)

(52) U.S. Cl.
CPC ............... *F01D 15/08* (2013.01); *B23B 3/24* (2013.01); *F01D 15/10* (2013.01); *F02C 6/14* (2013.01); *B23B 2215/81* (2013.01)

(58) Field of Classification Search
CPC . F01D 5/02; F01D 15/08; F01D 15/10; F01D 5/34; F05D 2220/32; F05D 2300/133; F05D 2230/10; F05D 2240/24; F05D 2250/82; F05D 250/80; F05D 2230/14; B23B 3/24; B23B 2215/81; B23B 27/04; B23B 1/00; B23C 3/00; B23D 5/00; B23D 13/00; B23D 79/00; B23D 5/02; B26F 1/02; B26F 1/38; B26F 1/3846; B21D 28/36;
(Continued)

(56) References Cited

U.S. PATENT DOCUMENTS 6,340,424 B1 1/2002 Elman et al.
9,101,991 B1 8/2015 Tingley, III et al.
(Continued)

*Primary Examiner* — Eric J Zamora Alvarez
(74) *Attorney, Agent, or Firm* — Frank M. Scutch, III

(57) ABSTRACT

A miniaturized turbogenerator (200) to directly provide electrical propulsion (307 308, 309) to small land, air, and maritime vehicles without an intervening electricity storage battery (315). The invention comprises of a process of miniaturization (500) of a turbine engine core (100), in particular its compressors and turbines (400), by means of hyper-feed machining by linear force alone, i.e. without rotation of either the workpiece or the cutting tool (505), and a resulting apparatus of a miniaturized turbogenerator (200) that has sufficient power density to provide high-performance electrical propulsion (310) for commercially feasible automobiles, urban air mobility vehicles, and other small vehicles and vessels with greater performance than battery-electric vehicles (300).

6 Claims, 5 Drawing Sheets

Related U.S. Application Data continuation-in-part of application No. 16/667,325, filed on Oct. 29, 2019, now abandoned.

(60) Provisional application No. 63/283,593, filed on Nov. 29, 2021, provisional application No. 62/754,741, filed on Nov. 2, 2018.

(51) Int. Cl.
| | |
|---|---|
| *B23D 5/00* | (2006.01) |
| *B23D 79/00* | (2006.01) |
| *F01D 15/02* | (2006.01) |
| *F01D 15/10* | (2006.01) |
| *F02C 6/14* | (2006.01) |
| *F02C 6/20* | (2006.01) |

(58) Field of Classification Search
CPC ....... Y10T 409/50082; Y10T 29/49325; Y10T 29/49336; Y10T 407/25; Y10T 83/9423; F02C 6/14

See application file for complete search history.

(56) References Cited

U.S. PATENT DOCUMENTS

| | | | |
|---|---|---|---|
| 9,991,763 B1* | 6/2018 | Downs | H02K 7/1823 |
| 10,801,338 B1* | 10/2020 | Memmen | F01D 5/18 |
| 2006/0236765 A1 | 10/2006 | Bouet et al. | |
| 2012/0201623 A1 | 8/2012 | Tingley, III et al. | |
| 2013/0149100 A1* | 6/2013 | Lawlor | F01D 1/10 |
| | | | 415/191 |
| 2015/0174784 A1 | 6/2015 | Tingley, III et al. | |
| 2018/0017071 A1 | 1/2018 | Hall | |
| 2019/0049114 A1* | 2/2019 | Monty | F02C 7/10 |

* cited by examiner

MINIATURIZED TURBOGENERATOR FOR THE DIRECT ELECTRICAL PROPULSION OF AUTOMOTIVE, URBAN AIR MOBILITY, AND SMALL MARINE VEHICLES

FIELD OF THE INVENTION

The present invention is directed to a new type of power plant that belongs to the category of gas turbine engines that produce shaft power as opposed to jet power. A shaft-power gas turbine engine drives a shaft to operate another mechanism that produces useful work.

CROSS-REFERENCE TO RELATED APPLICATIONS

The process is miniaturization that belongs to the category of hyper-feed machining by means of controlled fracturing that is fully described in Applicants' U.S. Pat. No. 9,101,991 entitled METHOD AND APPARATUS FOR NON-SPINDLE MULTI-AXIS MACHINING, which is assigned to Tennine Corp. and is herein incorporated by reference in its entirety.

BACKGROUND

Presently no axially symmetric fluted cutting tool, such as an end mill, nor any method of machining can make compressors and turbines needed to generate a high-power density of gas turbine engine.

The reason for this lack of machining capability is because even the most advanced machining processes rely upon rotating axially symmetric fluted cutting tools, such as an end mill, and these tools cannot by their nature produce the size and shape of compressors and turbines needed to achieve the power density sought by industry, NASA in particular. Hence there is a need to overcome the current limitations. The invention's apparatus achieves this by a unique miniaturization process.

SUMMARY OF THE INVENTION

It is the invention's product-by-process process that makes the invention's apparatus possible. Because the process is integral to the apparatus, the invention comprises both.

Specifically, the present invention is a miniaturized turbogenerator. It is a turbine engine that converts chemical energy into mechanical energy in combination with a generator that converts the turbine's output of mechanical energy into electrical energy.

Furthermore it is a turbogenerator with a miniaturized turbine engine core possessing sufficient power density and specific performance for practical use as an internal power plant to electrically propel automobiles, urban air mobility vehicles, small marine vessels, and other small surface, aerial, and maritime vehicles.

The invention operates as a power plant that fundamentally differs from all current turbogenerators by: (1) Its mobility as a part of the vehicle and (2) its electrical propulsion of vehicles by the direct transfer of electrical energy to an electric motor without an intervening battery to store and then transfer electrical energy to a motor.

In this way, a vehicle propelled by the invention, a turbogenerator vehicle (TGV), is unlike a battery electric vehicle (BEV). A TGV has its power plant onboard. A BEV has no internal power plant and must rely upon the repeated and frequent transfer of energy from external power plants for storage in a large internal battery. The invention is also unlike proposed turbine-engine hybrid electric vehicles (HEV), which can be propelled by electrical energy but only in the same manner as a BEV, and are essentially the same. Therefore, references herein to a BEV include the HEV.

Because a BEV lacks an internal power plant to directly propel a vehicle electrically, it is not practical in vehicles, especially urban air mobility ones, in which either one or some combination of the conditions of (1) reliability, (2) range, (3) high power density, and (4) high power-to-weight ratio are necessary to the vehicle's operation.

Miniaturization of the turbine-engine core—comprising of compressor, combustor, turbine, and shaft components— of the turbogenerator is the unique aspect of the invention that makes its use for the direct electrical propulsion of smaller vehicles not only possible but practical. The invention's miniaturization is an approximate-to-scale reduction in size and weight of larger high performance shaft-power gas turbine engines. Beyond this, its miniaturization makes possible optimizations for increased: (1) Thermal efficiency (the efficiency of the turbine engine's conversion of chemical energy into mechanical energy), (2) power density (the power produced by the power plant over the external volumetric size of the power plant), and (3) specific performance (power-to-vehicle weight ratio) that are unavailable to larger turbogenerators in the present art.

Of these three factors is it the high power density that the invention's miniaturization makes possible that the other two factors rely upon. This high power density is currently sought by industry to design and build small electrically-propelled vehicles that have the necessary thermal efficiency and specific performance with (1) rapid, high-quality, low-cost production, (2) high performance in speed, load, and range, and (3) high reliability in operation and maintenance.

In this context power density is the ratio of the power plant's transfer of energy over its external volumetric size or $D_P = kW/m^3$. NASA launched in June 2021 the Hybrid Thermally Efficient Core (HyTEC) project in pursuit of this objective. The project has been inhibited by the limitations of the current state-of-the-art in the manufacturing of gas turbine engine cores. Manufacturers currently lack the means to machine miniaturized compressor and turbine blades with the geometrically complex surfaces of the volutes formed between the blades that are required to achieve an adequate power density that practicable electrically-propelled small vehicles, especially aerial vehicles, need to perform.

Thus, embodiments of the present invention are direct to:
(1) A process 500 of miniaturization:
   (a) By hyper-feed machining in which material is removed from the workpiece 400;
   (b) by inducing controlled fracture with an axially asymmetrical cutting tool of any shape required driven by linear force alone,
   (c) as opposed to plastic deformation primarily by an axially symmetrical cutting tool driven by rotation about its axis;
(2) thus making possible the manufacturing of a miniaturized turbine-engine core 100:
   (a) In particular the compressors 101 102 and turbines 104 105 106 produced by the process 500,
   (b) in combination with an electrical generator 107,
   (c) that directly electrically propels 307 308 309 small surface, aerial, and maritime vehicles without an intervening electricity storage battery 315.

In yet other embodiments, the invention is directed to a mobile turbogenerator miniaturized to the size needed to make it a commercially feasible means of providing direct electrical propulsion, with no intervening electricity storage battery, for small vehicles 200. In a practicable un-optimized embodiment the invention's miniaturization comprises of (1) a power plant in a vehicle 306,
(2) providing 200 kW of electrical power for propulsion,
(3) with an external volume of approximately 1.4 cubic meters ($m^3$),
(4) resulting in a power density ratio of 140:1 $D_P$,
(5) at a thermal efficiency of approximately forty percent (40%), and
(6) an overall compressor ratio of forty-to-one (40:1).

The invention uniquely produces a power density ratio that is two magnitudes greater than current turbogenerators used to produce electricity. Without the invention there currently exists no means to electrically propel vehicles other than by onboard storage batteries.

BRIEF DESCRIPTION OF THE DRAWINGS

The accompanying figures, in which like reference numerals refer to identical or functionally similar elements throughout the separate views and which together with the detailed descriptions below are incorporated in and form part of the specification, serve to further illustrate various embodiments and to explain various principles and advantages all in accordance with the present invention.

DETAILED DESCRIPTION OF THE INVENTION

Figure 1:
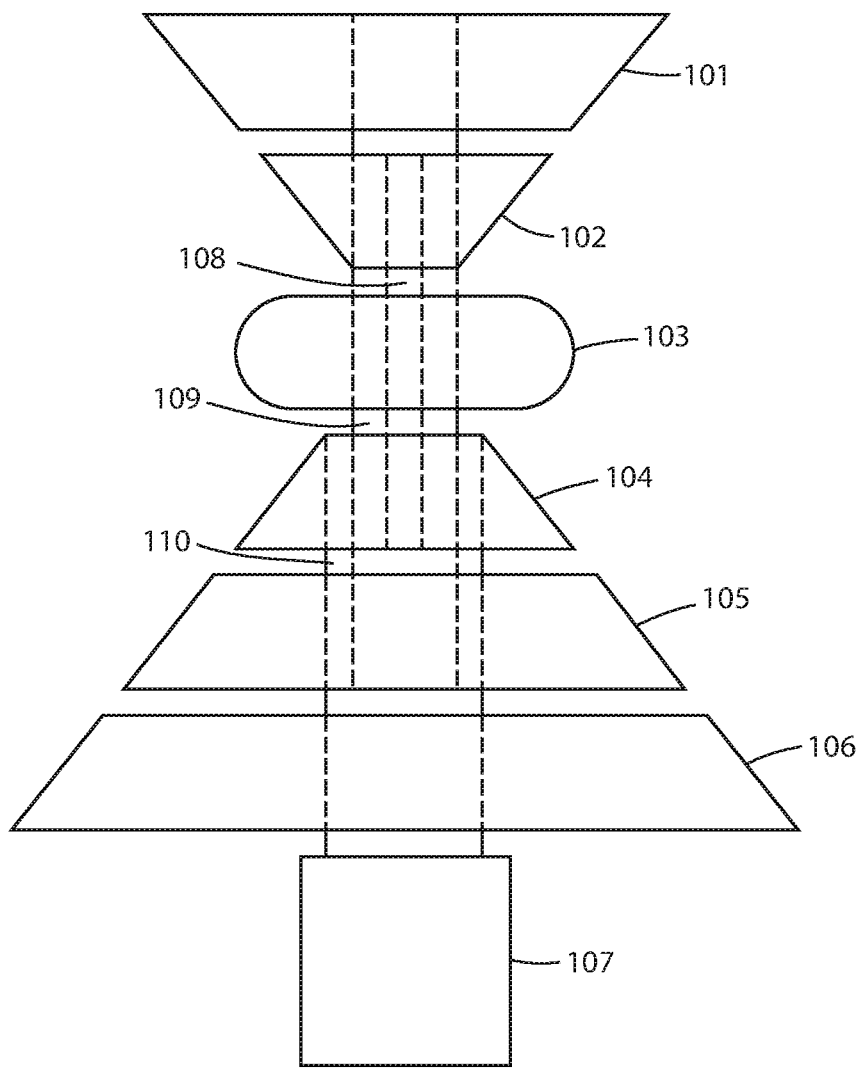
FIG. 1 is a diagram illustrating a three-spool miniaturized turbogenerator 100 where the low-pressure compressor (LPC) 101, the high-pressure compressor (HPC) 102, the combustor 103, the high-pressure turbine (HPT) 104, the low-pressure turbine (LPT) 105, the generator turbine 106, the electrical generator 107, and the three-spool shaft. These spools are the high-pressure spool connecting the HPT to the HPC 109, the low-pressure spool connecting the LPT to the LPC 108, and the generator spool connecting the generator turbine to the generator 110.
Figure 2:
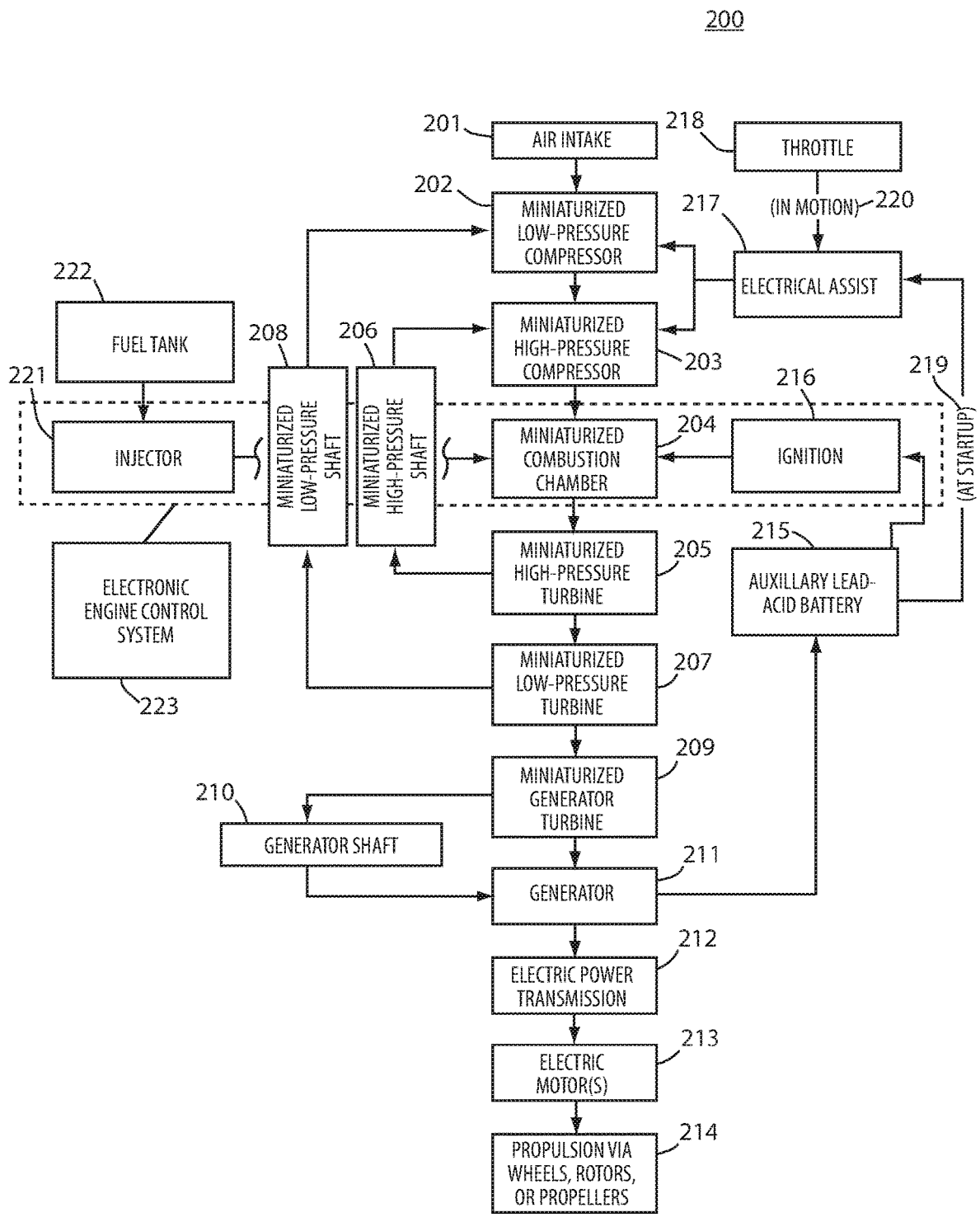
FIG. 2 is a block diagram illustrating the invention's production of electricity and distribution of electricity to the motors propelling the vehicle.
Figure 3:
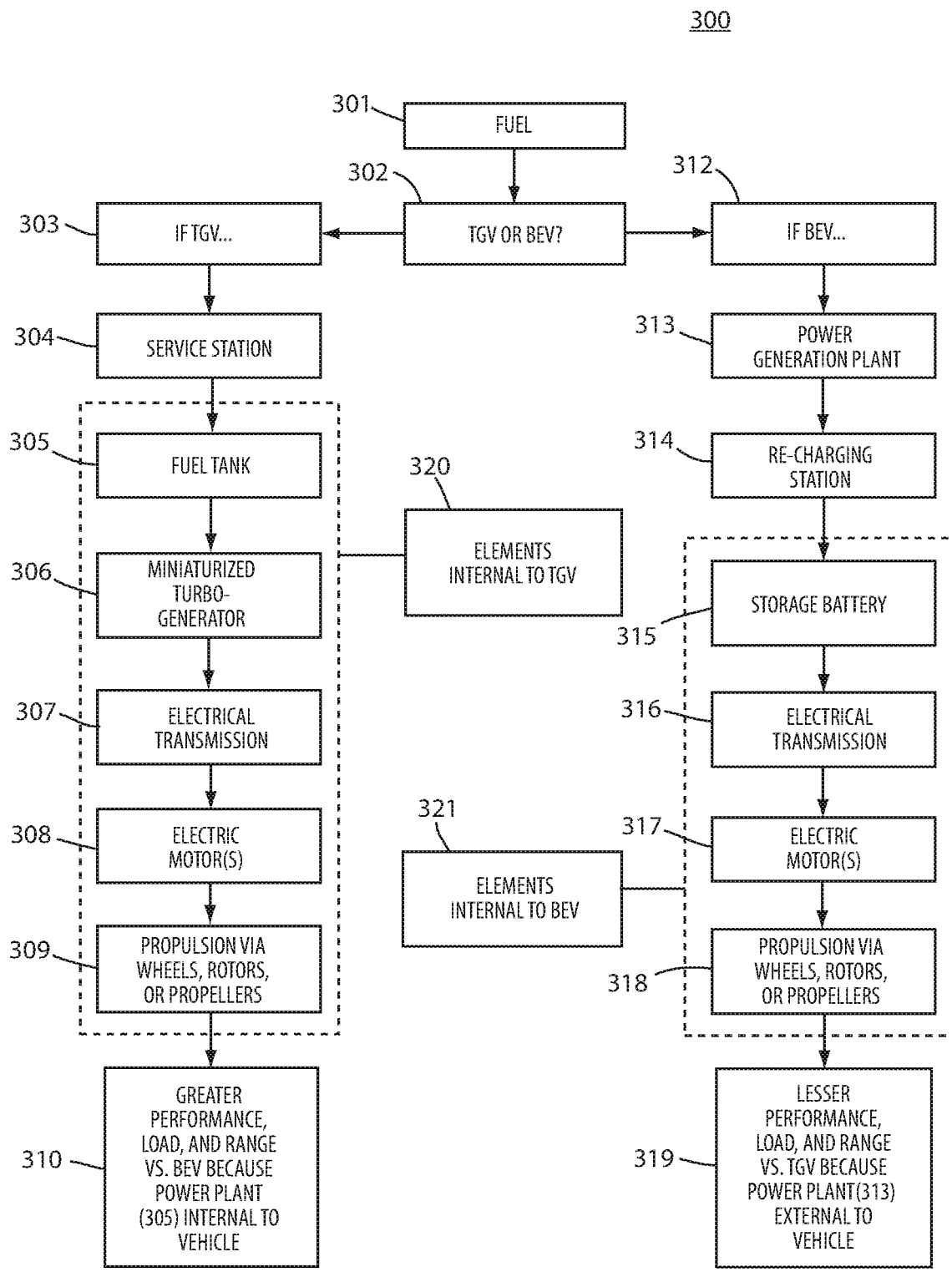
FIG. 3 is a flowchart diagram comparing the invention's production and distribution of electricity for propulsion to that of a BEV.
Figure 4:
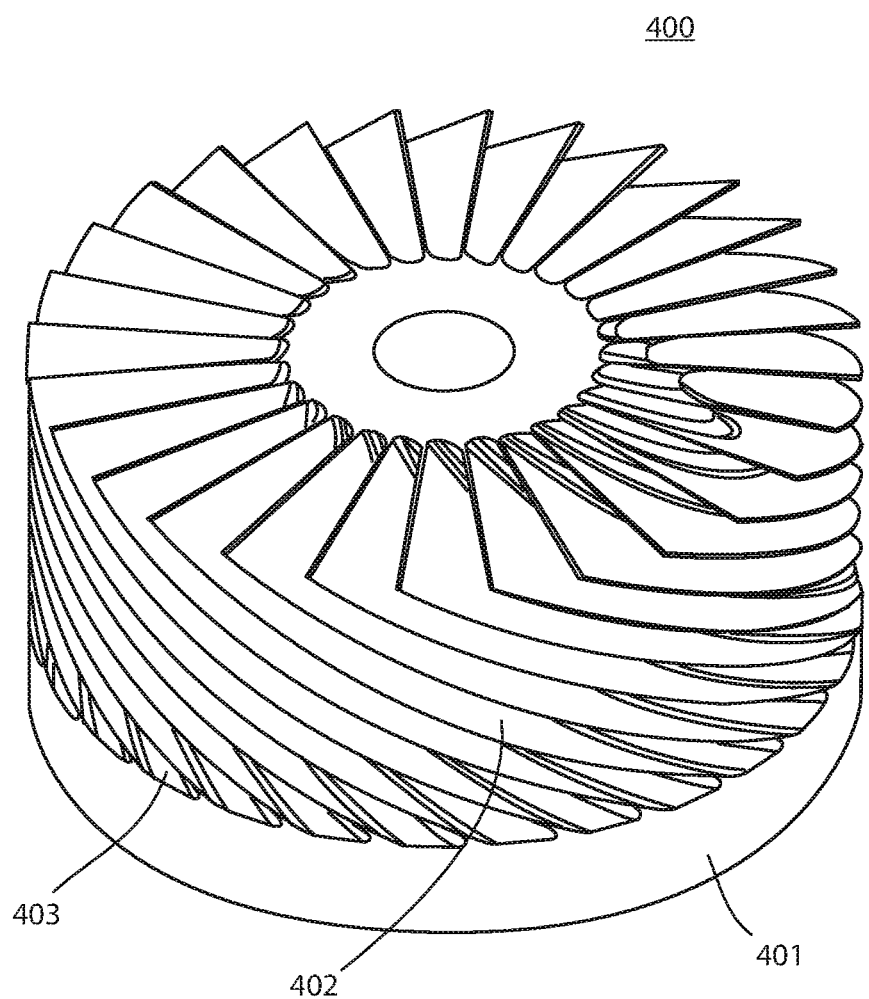
FIG. 4 is an isometric drawing illustrating the volutes formed by the blades of a miniaturized centrifugal compressor that cannot be machined with an axially symmetric fluted cutting tool, such as an end mill, and can only be machined by an asymmetrical cutting tool used in hyper-feed machining.
Figure 5:
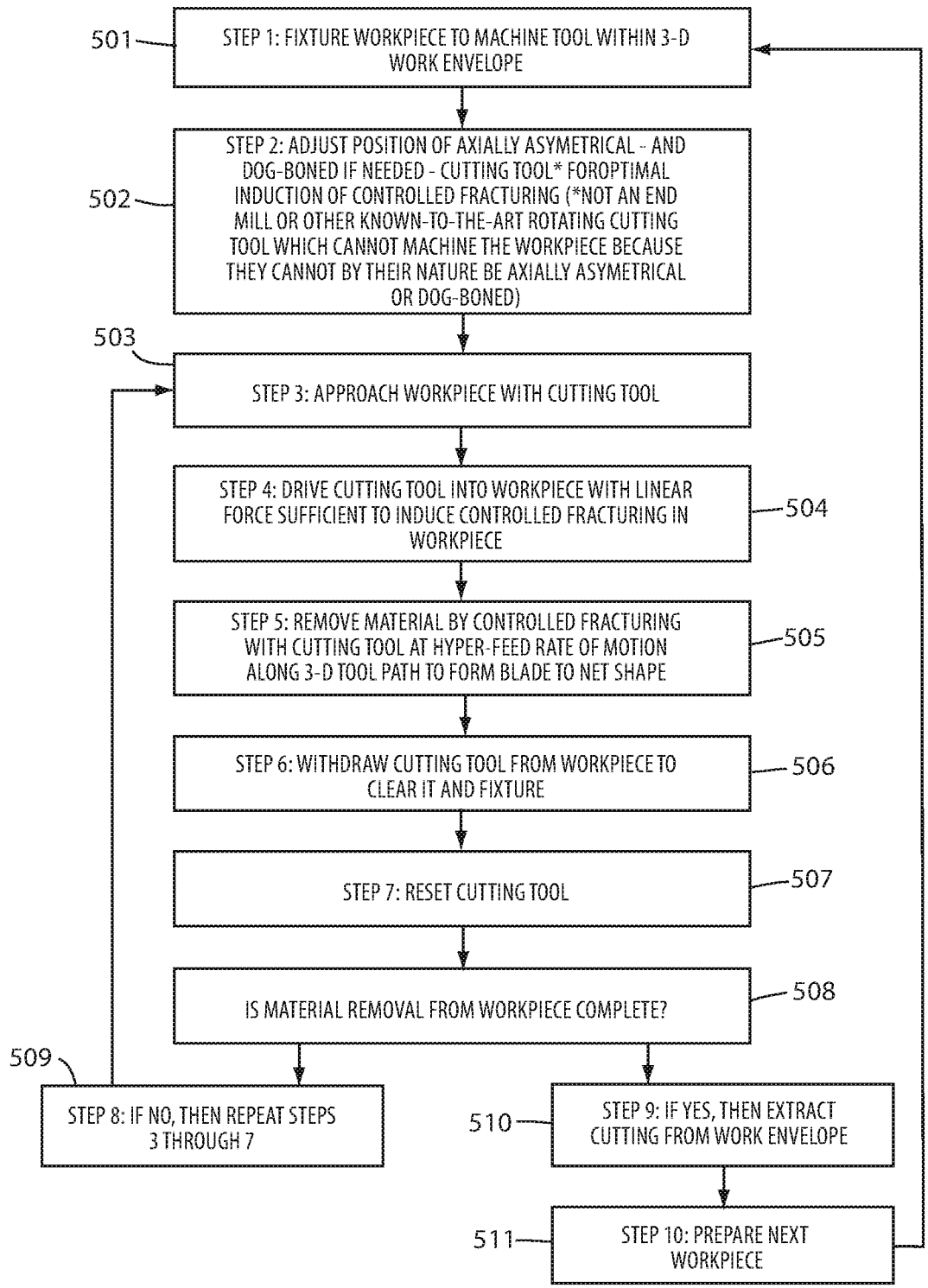
FIG. 5 is a flowchart diagram illustrating the steps of hyper-feed machining through the induction of controlled fracturing to produce miniaturized compressors and turbines.

Before describing in detail the embodiments that are in accordance with the present invention, it should be observed that the embodiments reside primarily in combinations of the method of hyper-feed machining and the apparatus of gas turbine engine bladed components. Accordingly, the method and apparatus have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The Invention's Process of Miniaturization Using Hyper-Feed Machining

The invention's process of miniaturization uses linear force only, no torque, to remove material from the workpiece to induce the physical phenomenon of controlled fracturing as described in Applicants' U.S. Pat. No. 9,101,991 entitled METHOD AND APPARATUS FOR NON-SPINDLE MULTI-AXIS MACHINING. It occurs by applying an impact force that simultaneously exceeds the yield strength and the breaking strength of the workpiece material to prevent plastic deformation. A controlled-fracture impact causes an axial projection of adiabatic banding of microcracks along the perimeter of the cutting tool to produce a repeatable, precise removal of workpiece material.

Hyper-feed machining induces the physical phenomenon of controlled fracturing to remove material from workpieces, specifically the miniaturized compressor and turbine components of the invention. The result is the fastest, most precise, and nearest net shape method of machining available to miniaturize a turbogenerator for the direct electrical propulsion of small vehicles.

The application of hyper-feed machining to the miniature compressors and turbines of a gas turbine engine core is new and useful, as evidenced in particular by the invention's application to commercially-feasible direct electrical propulsion small vehicles 200. The invention is an effective higher-performance and higher-efficiency replacement of not only BEV's but also piston engine vehicles.

The invention's process of miniaturization by hyper-feed machining entails many new and useful improvements in the manufacturing of the turbine-engine core of the apparatus, including:

(1) greater geometric complexity of the compressor and turbine blades 402, and in particular the volutes 403 formed by the blades, for improved performance, (2) greater precision in machining these bladed components to net shape, (3) greater precision and less distortion in machining thin cross-sections making possible greater reduction in the mass of these components—especially in embodiments with several stages of compressors and turbines—thus lowering the pressure needed to rotate individual turbines and so compressors, and (4) greater ease of production reducing the cost and time of manufacture while improving precision and dimensional accuracy, among other things. These are some of the elements of significantly increased production density (the value added by inputs of equipment, resources, and manpower over the time to output a finished product) resulting from the invention's process of miniaturization.

Hyper-feed machining not only overcomes the inherent limitations in the current use of computer numerical-controlled milling of compressors and turbines. It can miniaturize them to scales not possible by state-of-the-art machining. Hyper-feed machining does not rely upon torque as a cutting force. The cutting tool is driven strictly by linear force through the workpiece to machine to net shape the geometrically complex surface of the miniaturized compressor and turbine blades.

Thus, the invention's process of hyper-feed machining produces the desired net shape of a miniaturized compressor or turbine in a workpiece by using controlled fracturing to induce an abrupt, highly localized, and substantially extreme force of a cutting tool against the workpiece. This force must be sufficient to exceed the ultimate shear strength of the material of the workpiece. When the force is applied, adiabatic shear bands form in the workpiece as a microstructure of micro-cracks emanating in the direction normal to the face of the cutting tool along the outside contour of the cutting tool as projected into the workpiece.

Under the continued linear force of the cutting tool moving through the workpiece, this microstructure softens relative to the uncut material surrounding it, because the cracked material becomes highly fractured, even to the point of recrystallizing. Once softened, the cutting tool shears this material from the workpiece as waste which retains almost all of the heat generated by the process, because its microstructure of cracks retards the transfer of heat to material outside of the microstructure. The end result of this controlled-fracturing process is a miniaturized compressor or turbine cut to net shape from the workpiece, without the distortions and warping of heat generated by machining, using cutting tools with contours in accord with the complex surface geometries of these turbine-engine core components.

The method of hyper-machining miniaturized compressors and turbines is a process 500 that includes:

(1) Fixturing a workpiece 400 that is metal, or other material with metallic machining characteristics, to a table of the multi-axis machine tool within a three-dimensional work envelope 501;

(2) adjusting the position of the cutting face of a cutting tool that is axially asymmetrical—and dog-boned, if needed to clear previously machined surfaces of the workpiece 400 such as the blades 401 and volutes 402—by rotating either the cutting tool or workpiece so that the induction of controlled fracturing in the workpiece can be achieved 502 (notably, the cutting tool cannot be an end mill, or other known-to-the-art rotating axially symmetric fluted cutting tool, because they cannot cut the shape 401 402 required in the workpiece 400 because they cannot be, by their nature, either axially asymmetrical or dog-boned);

(3) approaching the surface of the workpiece with the cutting tool to a level sufficient to clear obstructions and to allow acceleration of the cutting tool to the speed required for the induction of controlled fracturing in the workpiece 503;

(4) driving the cutting tool with a linear force and without its rotation into the workpiece of at least 20,000 lbs/int to induce controlled fracturing by simultaneously exceeding the yield strength and the breaking strength of the workpiece material by an impact to cause the axial projection of adiabatic banding along the perimeter of the tool 504;

(5) removing by controlled fracturing the desired amount of workpiece material at a hyper-feed rate of motion along a three-dimensional tool path to form at least one blade 402 of a miniaturized compressor or turbine that conforms to the perimeter of the cutting face of the cutting tool 505;

(6) withdrawing the cutting tool from the workpiece to a predetermined level to clear the fixtured workpiece 506;

(7) resetting the cutting tool using the drive mechanism 507;

(8) if workpiece is not completed 508, then repeating Steps 3 through 7 until the all material is removed from the workpiece as fixtured 509 to form volutes 403 between the blades to net shape 402;

(9) if workpiece is completed 508, then retracting the cutting tool from the work envelope once the desired net shape of the miniaturized compressor or turbine blades 402 and resulting volutes 403 has been produced 510; and then

(10) setting up the next workpiece to repeat process 511.

The process 500 keeps the cutting tool continuously in cut as it is driven through the workpiece 400 and increases the rate of volumetric material removal by orders of magnitude over current methods of machining. For example, a compressor or a turbine 400 may have a 6-inch diameter base 401 with compound-curved blades 401 that are 0.030-inch thick and separated by a 0.100- to 0.141-inch wide volute 403, which is the spiral channel formed between the blades. Those skilled in the art will recognize that the dimensions of this example do not indicate any restrictions in the size and complexity of miniaturized compressors and turbines that can be machined by hyper-feed machining. Compressors and turbines from one-tenth to ten times the size of the example, and beyond, can be machined under the same principles, because this method of production is fully scalable.

With the workpiece, from which a miniaturized compressor or turbine 400 is to be machined, fixtured on a five-axis hyper-feed machining center, for example, the workpiece can be presented at any angle and orientation that maximizes the performance of the cutting tool. Volumetric material removal rates of hyper-feed machining are two or more orders of magnitude greater than the most advanced current milling methods. Typical of this performance on a workpiece is moving a 0.100-inch wide cutting tool through the workpiece at a feed rate of at least 1,200 inches a minute, thus completing a miniaturized compressor or turbine with a precise, accurate, extremely fine 16-microinch or better finish, net shape surface for the base 401, blades 402, and volutes 403 formed by the blades in about 10 minutes time. This compares to several hours or more with current milling methods with less precision and greater departures from net shape for miniaturized compressors and turbines, assuming that current methods can even machine the compound-curved surfaces of these core components in the first place.

The Invention's Product Forming a Miniaturized Turbogenerator

Employing linear force by means of hyper-feed machining eliminates restrictions on the shape and size of the cutting tool so that its cutting edge can more closely conform to the ideal design of a miniaturized compressor or turbine.

Uniquely to the invention's process, the machinability of compressor and turbine designs that are currently impractical or even impossible, which optimize the power density and therefore thermal efficiency, overall compressor ratio, and power-to-weight ratio of invention's apparatus are now possible. Indeed, the invention's process of machining optimally designed miniature compressors and turbines results in the invention's apparatus higher performance, relative to scale, of current turbogenerators of electricity.

More specifically hyper-feed machining makes possible the machining of compressor designs that increase the velocity of the intake air 201 to produce a sufficient static pressure for the combustor 204 to ignite the fuel-air mixture 216 221 at a thermal efficiency greater than 40%. This is because the volutes 403 of a centrifugal compressor 202 203 produce this result (1) by reducing the number of compressor stages or (2) by reducing or eliminating turbulence of intake air in their volutes or (3) reducing or eliminating heat waste through a greater number of a smaller diameter volutes or (4) reducing or eliminating heat waste through a greater partial enclosure of the volutes by the blades 402 forming them or (5) by others means or any combination of these elements that can now be machined.

A typical embodiment of the invention's apparatus 200 is a miniaturized turbogenerator 100 with one or more compressor stages 202 203 to produce an overall compressor ratio of 40:1 or more. The compressed air is then fed into the combustor 204 and undergoes an ignition of an air-fuel mixture 216 221 to eject a high-pressure flow of air. This air then turns (1) the high-pressure turbine 205, which rotates the spool 206 driving the high-pressure compressor 203, (2) the low-pressure turbine 207, which rotates the spool 208 driving the low-pressure compressor stage 202, and finally (3) a generator turbine 209, which rotates the spool 210 driving the generator 211 to produce electricity 212, which then is transmitting to the motor or motors 213 propelling the vehicle 214. The three spools are coaxial and so the combustor is annular in shape.

Without the optimizations peculiar to miniaturization, made possible by the invention's process of high production density hyper-feed machining, the invention's apparatus in this typical embodiment occupies of volume of 1.4 m³ within a vehicle with a power density ratio of 140:1 and produces 200 kW of electrical power at thermal efficiency of 40%.

Performance of the invention's apparatus can be improved with an electrically-assisted compressor 217, which uses an auxiliary lead-acid battery (in similar fashion as that in a piston-engine vehicle) to rapidly spool the apparatus's compressor stages 202 203 upon start-up 219 or otherwise regulate it to optimize performance and fuel consumption 218 220. A further enhancement would be an EEC (electronic engine control) 223 for the combustor 204 to enhance the turbogenerator's performance in producing electricity most efficiently depending upon the type of fuel 222 consumed and the conditions of vehicle operation.

These and other technologies are readily adaptable to improve the core performance of the miniaturized turbogenerator 200 to make it a higher performance power plant in terms of reliability, range, load, and operation and maintenance 310 than any other means used to propel a BEV 319 and piston engine vehicle.

Preferred Embodiments of the Invention

The invention is most readily used as a power plant 306 for the direct electrical propulsion 307, 308, 309 of automotive vehicles. Lacking the size, weight, and complexity of piston engines, it has a greater power-to-weight ratio that makes possible the production of larger, safer, more comfortable, and higher performance cars and trucks with much higher fuel efficiency.

The invention's miniaturized turbogenerator 200 as a mobile power plant 306 for the direct electrical propulsion 307 308 309 of automotive vehicles overcomes all of the deficiencies of battery electric (BEV) 312. As the power plant 305 320 for a turbogenerator vehicle (TGV) 303 it lacks the weight and expense of a large onboard electricity storage battery 315 321 that a BEV needs for electrical propulsion 316 317 318.

In contrast to the BEV 302, the driver of a TGV equipped with the invention has no "range anxiety" because it can be refueled 305 through the existing infrastructure of fueling stations 304 or can even carry an additional containers for external storage of fuel 301 to meet its relatively minimal refueling requirements. It is common misconception that a BEV is environmentally clean, but this is not so when it is understood that a BEV is like all other automotive vehicles. It too requires a power plant. However its power plant 313 is external to the vehicle, namely a fossil fuel, nuclear, or other type of plant 301 generating electricity that is distributed through the power grid. This requires the driver of a BEV to frequently recharge 314 its electricity storage battery 315 for lengthy periods of time. This limits general use of a BEV primarily to urban day trips and commuting.

A greater limitation on the widespread use of BEV's is the metal required to make their large storage batteries 315. Lithium, copper, rare earths, and other metals in short supply are critical to their production. These short supplies will severely limit the production of increasing numbers of BEV's and cause more environmental pollution than the current reliance upon fossil-fueled vehicles. The invention's miniaturized turbogenerator 200 entirely eliminates this problem because all it requires is a small conventional lead-acid auxiliary battery 215 for operation.

Another embodiment that is ideal for the invention is its use as the power plant 306 for an urban air mobility (UAM) vehicle as a TGV 303. The UAM vehicle must be small, capable of vertical or short take-off and landing, quiet in operation, and commercially feasible as taxis carrying as few as two or three passengers. As BEV's 312, UAM vehicles have all the same limitations that automotive BEV's do, only more severe. They must gain and sustain flight with sufficient reliability, range, load, and operational performance at levels significantly greater than automotive BEV's 319.

The invention's apparatus, through its very high-power density, provides UAM's with direct electrical propulsion that meets the commercially practicable requirements 310 demanded of these vehicles and meets the objective of NASA's HyTEC program to this end.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of manufacturing a miniaturized turbogenerator where bladed disk components of a gas turbine engine are manufactured from a workpiece by a process comprising the steps of:
   a) providing an asymmetrical cutting tool having an angled or curved shaft to clear any machined features of the workpiece that is attached to a non-spindle multi-axis computer numerical control (CNC) machine tool;
   b) adjusting a position of the cutting tool at a sufficient distance from the workpiece so that an acceleration of the cutting tool is sufficient to induce controlled fracturing upon impact with the workpiece;
   c) accelerating the cutting tool to a point of impact with the workpiece;
   d) driving the cutting tool with a sufficient linear force of at least 20,000 lbs/in$^2$ to induce and maintain controlled fracturing for material removal;
   e) moving at a rate of motion of 1200 inches/minute through the workpiece such that the rate of motion is at least one magnitude greater in feed rate than a rotating axially symmetric fluted cutting tool and wherein the workpiece material is micro-cracked allowing the cutting tool to shear material from the workpiece as waste, retaining a majority of the heat generated in the waste in that an end result of the controlled-fracturing is a shape cut into the workpiece with a same contour as the cutting tool such that an overall size of the workpiece is greatly reduced in scale for producing a turbine having at least twenty-eight (28) blades such that a thickness of the blades is thinner in cross-section than those provided by rotary machining;
   f) following a three-dimensional tool path that removes material from the workpiece to produce a plurality of blades and volutes that conform to a perimeter of a cutting face of the cutting tool to produce a plurality of compound-curved shapes so each one of the blades are folded over a neighboring blade;
   g) adjusting the cutting face of the cutting tool such that a finished surface to be produced is oriented perpendicularly to a cutting edge of the cutting tool and the cutting face is always normal to the tool path; and
   h) upon reaching an end of the tool path, steps a) to g) are repeated until a precise net shape of compressor and turbine blades and the volutes between the blades is produced.

2. The method of manufacturing as in claim 1, where controlled-fracture machining simultaneously exceeds both the yield strength and the breaking strength of the workpiece material and which causes an axial projection of adiabatic shear banding into the workpiece material along a perimeter of the cutting tool.

3. The method of manufacturing as in claim 1, wherein the compressor and turbine blades and volutes more effectively dissipate heat than that of a rotary machined blade.

4. The method of manufacturing as in claim 1, wherein each shape of the compressor and turbine blades around the volutes formed between the blades can vary to increase horsepower, thermal efficiency, and power density of the gas turbine engine.

5. The method of manufacturing as in claim 1, wherein the cutting tool is not a rotating axially symmetric fluted cutting tool.

6. The method of manufacturing as in claim 1, wherein the cutting tool is not a spindle-driven rotating cutting tool.

* * * * *